US012633567B2

(12) United States Patent
Kim et al.

(10) Patent No.: US 12,633,567 B2
(45) Date of Patent: May 19, 2026

(54) SWELLING TAPE FOR SECONDARY BATTERY AND CYLINDRICAL TYPE SECONDARY BATTERY INCLUDING THE SAME

(71) Applicant: LG ENERGY SOLUTION, LTD., Seoul (KR)

(72) Inventors: Soo Jung Kim, Daejeon (KR); Duk Hyun Ryu, Daejeon (KR); Min Gi Jeong, Daejeon (KR); Han Saem Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 997 days.

(21) Appl. No.: 17/789,339

(22) PCT Filed: Apr. 2, 2021

(86) PCT No.: PCT/KR2021/004147
§ 371 (c)(1),
(2) Date: Jun. 27, 2022

(87) PCT Pub. No.: WO2021/206381
PCT Pub. Date: Oct. 14, 2021

(65) Prior Publication Data
US 2022/0376289 A1      Nov. 24, 2022

(30) Foreign Application Priority Data

Apr. 6, 2020     (KR) ........................ 10-2020-0041322
Apr. 1, 2021     (KR) ........................ 10-2021-0042758

(51) Int. Cl.
H01M 10/04          (2006.01)
C09J 1/00            (2006.01)
(Continued)

(52) U.S. Cl.
CPC ........... H01M 10/0431 (2013.01); C09J 1/00 (2013.01); C09J 7/201 (2018.01); C09J 7/30 (2018.01);
(Continued)

(58) Field of Classification Search
None
See application file for complete search history.

(56) References Cited

U.S. PATENT DOCUMENTS

2011/0067799 A1*    3/2011    Mussig ...................... C09J 7/38
                                                            156/324
2012/0115025 A1     5/2012    Kim et al.
(Continued)

FOREIGN PATENT DOCUMENTS

CN          102197104 A   *   9/2011   ............... C09J 7/38
CN          103597635 A       2/2014
(Continued)

OTHER PUBLICATIONS

Espacenet machine translation of JP2006202577A (Year: 2006).*
(Continued)

*Primary Examiner* — Haroon S. Sheikh
(74) *Attorney, Agent, or Firm* — Birch, Stewart, Kolasch & Birch, LLP

(57)          ABSTRACT

A swelling tape including a base layer and an adhesive swelling is provided. The adhesive swelling layer contains a water-based self-healing binder. An electrode assembly in which the swelling tape is attached to an outer circumferential surface thereof, and a secondary battery including the electrode assembly are also provided.

10 Claims, 3 Drawing Sheets

(51) Int. Cl.
    *C09J 7/20*          (2018.01)
    *C09J 7/30*          (2018.01)

(52) U.S. Cl.
    CPC ..... *H01M 10/0422* (2013.01); *C09J 2203/33*
    (2013.01); *C09J 2400/12* (2013.01); *C09J*
    *2405/00* (2013.01); *C09J 2433/00* (2013.01);
    *C09J 2475/00* (2013.01)

(56) References Cited

U.S. PATENT DOCUMENTS

| | | |
|---|---|---|
| 2014/0100207 A1 | 4/2014 | Kim et al. |
| 2015/0147640 A1 | 5/2015 | Kim et al. |
| 2015/0270524 A1 | 9/2015 | Hwang et al. |
| 2015/0307752 A1 | 10/2015 | Park et al. |
| 2016/0359201 A1 | 12/2016 | Do et al. |
| 2021/0351461 A1 | 11/2021 | Yang et al. |

FOREIGN PATENT DOCUMENTS

| | | | |
|---|---|---|---|
| CN | 109585714 A | 4/2019 | |
| JP | 9-239903 A | 9/1997 | |
| JP | 2006-202577 A | 8/2006 | |
| JP | 2007-176886 A | 7/2007 | |
| JP | 2014-227391 A | 12/2014 | |
| JP | 2016-505652 A | 2/2016 | |
| JP | 2017-510043 A | 4/2017 | |
| KR | 10-2012-0035090 A | 4/2012 | |
| KR | 10-2012-0085371 A | 8/2012 | |
| KR | 10-2014-0063478 A | 5/2014 | |
| KR | 10-2016-0074787 A | 6/2016 | |
| KR | 10-2017-0138670 A | 12/2017 | |
| KR | 10-1873472 B1 | 7/2018 | |
| KR | 10-2019-0066410 A | 6/2019 | |
| KR | 10-2019-0099597 A | 8/2019 | |
| KR | 10-2020-0017291 A | 2/2020 | |
| WO | WO 2012/138153 A2 | 10/2012 | |

OTHER PUBLICATIONS

CN102197104A—machine translatoin (Year: 2011).*
Extended European Search Report for European Application No. 21785670.7, dated Aug. 1, 2023.
International Search Report (PCT/ISA/210) issued in PCT/KR2021/004147, dated Jul. 21, 2021.

* cited by examiner

200

202
220

(a)

200

220(a)
202
220(b)

(b)

200

201
202
203
220

(c)

300

SWELLING TAPE FOR SECONDARY BATTERY AND CYLINDRICAL TYPE SECONDARY BATTERY INCLUDING THE SAME

CROSS-REFERENCE TO RELATED APPLICATIONS

This application claims priority from Korean Patent Application Nos. 10-2020-0041322, filed on Apr. 6, 2020, and 10-2021-0042758, filed on Apr. 1, 2021, the disclosures of which are incorporated by reference herein.

TECHNICAL FIELD

The present invention relates to a swelling tape for a secondary battery and a cylindrical type secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications, and, among these secondary battery technologies, lithium secondary batteries having the theoretically highest energy density are in the spotlight.

A lithium secondary battery has an operating voltage of about 3.6V, wherein, since it has a capacity of about three times that of a nickel-cadmium battery or nickel-hydrogen battery, which is frequently used as a power source of electronic equipment, and has high energy density per unit weight, there is a tendency that a degree of utilization of the lithium secondary battery increases rapidly.

A lithium secondary battery is composed of an electrode assembly, in which a positive electrode plate coated with a positive electrode active material and a negative electrode plate coated with a negative electrode active material are disposed with a separator disposed therebetween, an electrolyte, and a case that seals and accommodates them together.

The lithium secondary battery may be classified into a can type secondary battery and a pouch type secondary battery according to a shape of the battery case. The can type secondary battery may be further classified into a cylindrical type secondary battery and a prismatic type secondary battery according to a shape of a metal can, and may be prepared by accommodating a jelly-roll type electrode assembly, in which a positive electrode, a separator, and a negative electrode are wound, in the metal can. The pouch type secondary battery may be prepared by placing a stacked type electrode assembly, in which a plurality of positive electrodes, separators, and negative electrodes are sequentially stacked, in a pouch composed of an aluminum laminate sheet, and then sealing the pouch.

Since the lithium secondary battery may be accommodated in machines which are frequently mobile and subjected to strong vibrations like automobiles, portability and strong vibration-resistant properties are required.

However, with respect to the cylindrical type secondary battery, since the electrode assembly is formed in a smaller size than a cylindrical battery case (metal can) in order to accommodate the electrode assembly inside the cylindrical battery case, a gap is formed between the electrode assembly and an inner wall of the battery case. This gap causes the electrode assembly to move up and down or left and right in the battery case when vibration or impact is applied from the outside due to a fall or the like.

The movement of the electrode assembly may increase internal resistance of the battery or may cause a power insensitive phenomenon of the secondary battery due to cutting of a tab connected between the electrode assembly and a cap assembly. In addition, since a sealing portion may be damaged or separated by applying an impact to the cap assembly coupled to an upper end opening of the secondary battery, a problem of leaking the electrolyte in the secondary battery may occur.

In order to prevent the movement of the electrode assembly, a method of using a special tape, such as a swelling tape, has recently been applied.

As illustrated in FIG. 1, if an electrolyte is injected after a swelling tape composed of an adhesive layer 110 and a swelling layer 120 is attached to an outer circumferential surface of a jelly-roll type electrode assembly 100, in which a positive electrode, a separator, and a negative electrode are wound, and this is accommodated in a cylindrical battery case, the swelling layer expands and fills a gap existing between the electrode assembly and the battery case, and thus, the movement of the electrode assembly may be prevented.

A urethane resin, such as conventional thermoplastic polyurethane (TPU) or curable urethane, is being used as the swelling layer. However, with respect to the urethane resin, since heat resistance and fire resistance are low and it easily transmits vibration or impact to the electrode assembly, there is a disadvantage in that it is vulnerable to prevention of vibration or impact in the battery.

Thus, there is a need to develop a new swelling tape which may effectively prevent the movement of the electrode assembly even with strong vibration or impact.

DISCLOSURE OF THE INVENTION

Technical Problem

An aspect of the present invention provides a swelling tape for a secondary battery which may effectively prevent movement of an electrode assembly in a battery.

Another aspect of the present invention provides an electrode assembly, in which the swelling tape for a secondary battery is attached to an outer circumferential surface of the electrode assembly, and a cylindrical type secondary battery including the same.

Technical Solution

According to an aspect of the present invention, there is provided a swelling tape for a secondary battery which includes: a base layer and an adhesive swelling layer, wherein the adhesive swelling layer contains a water-based self-healing binder.

The swelling tape for a secondary battery may further include at least one layer selected from an adhesive layer and a back coating layer.

According to another aspect of the present invention, there is provided an electrode assembly in which the swelling tape for a secondary battery is attached to an outer circumferential surface of the electrode assembly.

According to another aspect of the present invention, there is provided a cylindrical type secondary battery which includes: the electrode assembly, an electrolyte, and a cylindrical battery case accommodating the electrode assembly and the electrolyte.

Advantageous Effects

Since a swelling tape of the present invention includes an adhesive swelling layer containing a water-based self-healing binder on at least one surface of both surfaces of a base layer, it prevents unwinding of an electrode assembly in a wound state and simultaneously fills a gap between the electrode assembly and an inner wall of a battery case at a low cost, and, thus, it may effectively prevent movement of the electrode assembly. Accordingly, it may prevent a secondary battery from being damaged, ignited, and exploded due to a short circuit caused by deformation of the electrode assembly, and may also prevent electrolyte leakage due to damage to a coupling portion of a cap assembly. As a result, a secondary battery having high stability and effectively improved resistance increase rate and power insensitive phenomenon may be achieved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

Figure 1:
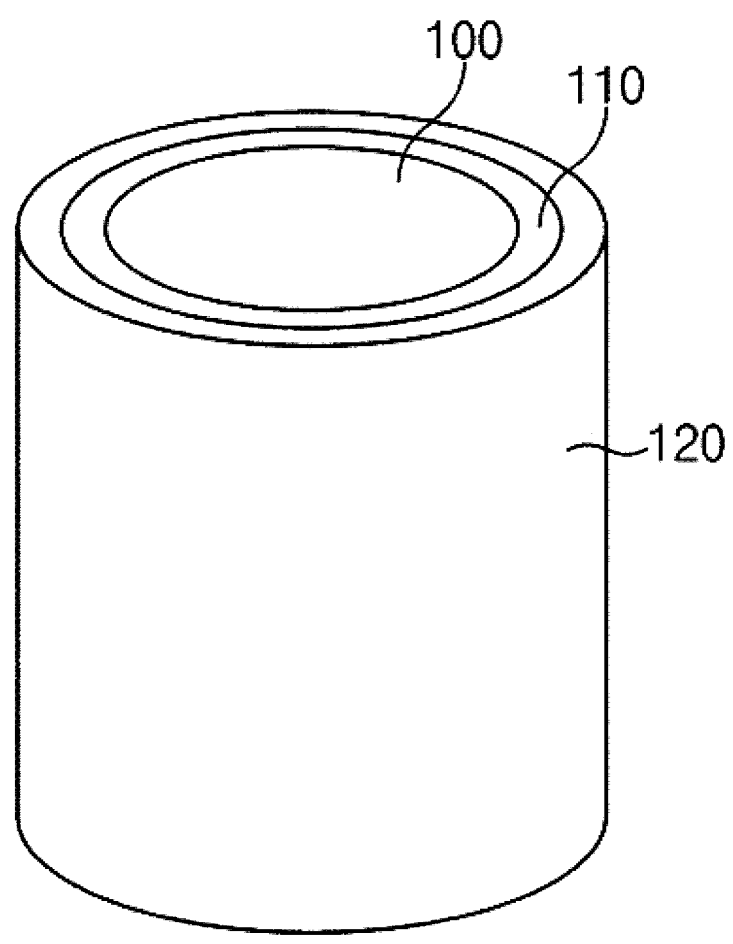
FIG. 1 is a schematic view of using a swelling tape on a conventional jelly-roll type electrode assembly.

100, 330: Electrode Assembly
110, 201: Adhesive Layer
120: Swelling Layer
200: Swelling Tape
202: Base Layer
203: Back Coating Layer
220, 220(*a*), 220(*b*): Adhesive Swelling Layer Containing Water-based Self-healing Binder
300: Cylindrical Type Secondary Battery
310(*a*): Swelling Tape
310(*b*): Swollen Swelling Tape
320: Cylindrical Battery Case (Cylindrical Can)

MODE FOR CARRYING OUT THE INVENTION

Hereinafter, various examples of the present invention will be described in detail with reference to the accompanying drawings in such a manner that it may easily be carried out by a person with ordinary skill in the art to which the present invention pertains. The invention may, however, be embodied in many different forms and should not be construed as being limited to the examples set forth herein.

The expression "swelling tape" in the present specification may mean a tape which is located in a gap between two objects spaced apart from each other to fill the gap and play a role in being able to fix the two objects to each other, if necessary. In one example, in a state in which the swelling tape is attached to any one of the two objects through an adhesive layer, the swelling tape refers to a tape which may achieve a three-dimensional shape capable of filling the gap by a mutual balance between a force generated by expansion of a swelling layer and a fixing force of the adhesive layer.
Swelling Tape A swelling tape according to the present invention includes a base layer and an adhesive swelling layer,
wherein the adhesive swelling layer may contain a water-based self-healing binder.
(1) Base Layer The base layer is a layer in the form of a film or sheet having deformation (expansion) properties when it is in contact with a fluid like a liquid such as an electrolyte, wherein it may have a shape, such as a circular, triangular, or amorphous shape, in addition to a square shape.

Various base layers commonly used in a conventional swelling tape may be used without limitation as the base layer, and the base layer may specifically include at least one polymer material selected from polyacrylate, thermoplastic polyurethane (TPU), polyvinyl chloride, polyethylene terephthalate, polyethylene, polypropylene, polyamide, polycarbonate, polyimide, and polystyrene, and may preferably include at least one selected from the group consisting of polyurethane and polystyrene.

A thickness of the base layer may be selected in consideration of the three-dimensional shape to be achieved or a size of the gap to be filled, and the base layer may be specifically formed to a thickness of 10 μm to 40 μm, for example, 20 μm to 40 μm.
(2) Adhesive Swelling Layer The adhesive swelling layer of the present invention is a layer capable of filling the gap between the electrode assembly and a battery case by swelling when the electrolyte is impregnated or heat is applied, wherein it may achieve a maximum volume increase rate of 100% or more.

A water-based self-healing binder having a glass transition temperature of −50° C. to −30° C. may be included as a component of the adhesive swelling layer.

The water-based self-healing binder is a polymer having a property of swelling (expansion) by being in contact with an organic solvent contained in the electrolyte, or swelling by heat, etc., wherein, as a representative example thereof, it may include at least one compound selected from a ceramic matrix composite (CMC), alginate, and chitosan. Specifically, the water-based self-healing binder may include at least one compound selected from the group consisting of alginate and chitosan.

Since the alginate, as a very high molecular weight polymer, has excellent self-recovery ability, it has an excellent effect of filling the internal gap during impact when it is used in the swelling tape, and thus, it may effectively suppress the movement of the electrode assembly. In addition, since it has a strong anion component in a side chain, it is advantageous in that battery operating characteristics may be expressed even under an electric field by facilitating ion movement in the electrolyte. The alginate specifically means sodium alginate, and, in addition, ethyl lauroyl alginate or propylene glycol alginate may be used.

The chitosan is an environmentally friendly material, wherein, since it is not only inexpensive, but also contains a large amount of hydroxy groups, it is advantageous in that binding performance is excellent. Thus, in a case in which the chitosan is used in the swelling tape, since it improves adhesiveness of the swelling tape to the electrode assembly, a secondary battery having excellent processability and reduced manufacturing costs may be prepared. Also, since the chitosan contains a nitrogen element in its structure, oxygen adsorption and decomposition ability are improved due to an oxygen reduction reaction by nitrogen atoms when the chitosan is used in the swelling tape, and thus, electrical conductivity of the secondary battery may be further improved.

In the present invention, since high adhesiveness may be secured by using the water-based self-healing binder in the swelling tape, the use of an additional adhesive, such as an acrylic pressure sensitive adhesive (PSA), may be omitted and the gap between the electrode assembly and the battery case may be completely filled by physical properties expanding due to heat or impact. Thus, since the movement of the electrode assembly may be prevented even when vibration or impact is applied from the outside due to a fall of the battery, a stable secondary battery with improved impact resistance may be achieved.

The adhesive swelling layer may be formed on at least one surface of both surfaces of the base layer.

After the water-based self-healing binder is dissolved in water to prepare a binder composition, the adhesive swelling layer may be prepared by coating the base layer with the binder composition and drying the coated base layer.

The adhesive swelling layer may be formed to a thickness of about 10% to 50%, for example, 10% to 30% of a total thickness of the base layer. In a case in which the thickness of the adhesive swelling layer satisfies the above range, the gap between the electrode assembly (jelly roll type) and the battery case may be filled to provide a battery that is resistant to an external impact such as vibration. That is, in the case that the thickness of the adhesive swelling layer is about 10% or more with respect to the total thickness of the base layer, a purpose of preventing the movement of the electrode assembly may be achieved by sufficiently filling the gap. In a case in which the thickness of the adhesive swelling layer is greater than about 50% of the total thickness of the base layer, since an outer diameter of the electrode assembly (J/R) is increased due to an increase in the thickness of the swelling tape, battery deformation occurs due to the expansion of the electrode assembly during a cycle operation, and thus, cell performance may be degraded.

The adhesive swelling layer may be formed in an area ranging from 50% to 99%, for example, 70% to 95% of a total area of one surface of the base layer.

In a case in which the area of the adhesive swelling layer satisfies the above range, cost-effective vibration resistance may be achieved. If, in a case in which the area of the adhesive swelling layer is greater than 99% of the total area of the base layer, it is not economically favorable, and, in a case in which the area of the adhesive swelling layer is less than 50%, since the area of the adhesive swelling layer is excessively small, an effect of preventing the movement of the electrode assembly may be insignificant.

The swelling tape of the present invention may further include at least one layer selected from an adhesive layer and a back coating layer, which will be described later, if necessary, in order to further improve adhesion and swelling effects.

(3) Adhesive Layer

The adhesive layer is a layer added to further improve adhesion of the swelling tape to the electrode assembly, wherein it may be designed to achieve an appropriate adhesive force, in other words, an appropriate peeling force, to the electrode assembly.

The peeling force of the adhesive layer may be changed according to the size of the three-dimensional shape to be achieved or the gap to be filled, wherein a lower limit thereof may be 100 gf/25 mm or more, 200 gf/25 mm or more, 400 gf/25 mm or more, 600 gf/25 mm or more, 800 gf/25 mm or more, 1,000 gf/25 mm or more, 1,200 gf/25 mm or more, 1,400 gf/25 mm or more, 1,600 gf/25 mm or more, or 1,800 gf/25 mm or more. Also, an upper limit of the peeling force of the adhesive layer is not particularly limited as long as it has a general range, but may be approximately 5,000 gf/25 mm or less.

The peeling force is a peeling force measured at room temperature, and is a result measured at a peeling rate of 5 mm/sec and a peeling angle of 180°. The "room temperature" is a natural temperature that is not heated or cooled, wherein, for example, it may mean a temperature of about 10° C. to about 30° C., particularly about 20° C. to about 30° C., and more particularly about 25° C.

In a case in which the peeling force of the adhesive layer is greater than the above range, it may be difficult to achieve the three-dimensional shape by excessively suppressing deformation of the swelling layer. Also, when the peeling force of the adhesive layer is less than the above range, an effect of achieving adhesiveness to be secured when the swelling tape is expanded may be insignificant.

The adhesive layer may include an acrylic polymer having a weight-average molecular weight (Mw) of 400,000 or more. Specifically, the acrylic polymer may include a polymer in a form in which a (meth)acrylic acid ester monomer and a copolymerizable monomer having a crosslinkable functional group are polymerized. In this case, a weight ratio of each monomer is not particularly limited, and may be appropriately designed in consideration of a desired peeling force.

An alkyl (meth)acrylate having an alkyl group having 1 to 15 carbon atoms may be used as the (meth)acrylic acid ester monomer in consideration of cohesion of the adhesive, glass transition temperature, or adhesiveness. As the monomer, one, such as methyl (meth)acrylate, ethyl (meth)acrylate, n-propyl (meth)acrylate, isopropyl (meth)acrylate, n-butyl (meth)acrylate, t-butyl (meth) acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate, or two or more thereof may be exemplified, but the present invention is not limited thereto.

The copolymerizable monomer having a crosslinkable functional group may include a monomer which may be copolymerized with the (meth)acrylic acid ester monomer through crosslinking and may provide a crosslinking point capable of reacting with a multifunctional crosslinking agent in a main chain of the polymer after the copolymerization. The crosslinkable functional group may be a hydroxy group, a carboxyl group, an isocyanate group, a glycidyl group or an amide group, and, in some cases, may be a photocrosslinkable functional group such as an acryloyl group or a methacryloyl group. Typical examples of the copolymerizable monomer having a crosslinkable functional group may be monomers having a hydroxy group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate; monomers having a carboxyl group such as (meth)
acrylic acid, 2-(meth)acryloyloxy acetic acid, 3-(meth)acry-
loyloxy propyl acid, 4-(meth)acryloyloxy butyl acid, acrylic
acid duplex, itaconic acid, maleic acid, and maleic anhy-
dride; glycidyl (meth)acrylate, (meth)acrylamide, N-vinyl
pyrrolidone, or N-vinyl caprolactam, but the present inven-
tion is not limited thereto. At least one of these monomers
may be included in the polymer.

The adhesive layer may be formed to a thickness of 5 μm
to 20 μm, for example, 10 μm to 20 μm. If the thickness of
the adhesive layer is greater than 20 μm, since the outer
diameter (volume) of the jelly-roll type electrode assembly
is increased to reduce dispersibility of the electrolyte due to
productivity problems and a decrease in space in the cell,
safety and overall performance of the secondary battery may
be degraded.

The adhesive layer may be formed i) between the base
layer and the adhesive swelling layer, or may be formed ii)
on at least one surface selected from the base layer and the
adhesive swelling layer in order to secure more improved
adhesiveness.

(4) Back Coating Layer

The back coating layer is a layer added to further improve
the gap filling effect, wherein it may be formed of a
thermosetting adhesive material which swells while an ori-
entation is partially reduced by contact and impregnation
with the electrolyte, or exhibits adhesiveness when heat is
applied in a predetermined amount or more.

Specifically, the back coating layer may include a single
material selected from the group consisting of polyimide,
polybuthylene terephthalate (PBT), polyamideimide (PAI),
perfluoroalkoxy (PFA), polysulfone (PSF), polyarylsulfone
(PAS), polytetrafluoroethylene (PTFE), fluorinated ethylene
propylene (FEP), ethylenetetrafluoroethylene (ETFE), and
polyethylene naphthalene (PEN), or a mixture of two or
more thereof.

With respect to the back coating layer, since adhesiveness
is expressed by heat, the adhesiveness is not expressed when
the electrode assembly, to which the swelling tape using the
back coating layer is attached, is inserted into a battery case,
and thus, the electrode assembly may be easily accommo-
dated.

Thereafter, when an electrolyte is injected into the battery
case, the gap may be filled while the back coating layer
expands. Furthermore, if a heat application process is per-
formed in a preparation process of the secondary battery,
since the adhesiveness of the back coating layer is
expressed, the movement of the electrode assembly may be
more effectively improved while the adhesion of the swell-
ing tape is improved. In this case, the heat application
process may be an aging process performed during a con-
ventional secondary battery preparation process, or a sepa-
rate additional process may be added.

The back coating layer may be formed i) between the base
layer and the adhesive swelling layer, or may be formed ii)
on the adhesive swelling layer in order to secure more
improved adhesiveness.

wherein the adhesive layer and the back coating layer are
formed on one surface and the other surface of the base
layer, respectively.

It is desirable that the swelling tape of the present inven-
tion is formed to a total thickness of 200 μm or less,
particularly 20 μm to 200 μm, and more particularly 20 μm
to 150 μm, for example, 40 μm to 120 μm. If, in a case in
which the thickness of the swelling tape is less than 20 μm,
since it is difficult to secure a sufficient thickness even by the
heat or the contact with the electrolyte, it may be difficult to secure the effect of preventing the movement of the elec-
trode assembly. Also, in a case in which the thickness of the
swelling tape is greater than 200 μm, since the accommo-
dation of the electrode assembly in the battery case is not
only not easy, but a space between the battery case and the
electrode assembly is also reduced to reduce the dispers-
ibility of the electrolyte and reduce an electrolyte injection
amount by that much, there is a disadvantage in that it is
difficult to secure capacity of the secondary battery.

The swelling tape of the present invention may be pre-
pared in various structures including the base layer and the
adhesive swelling layer as well as selectively the adhesive
layer and/or the back coating layer. Specifically, FIG. 2
schematically illustrates examples of various configurations
of the swelling tapes according to embodiments of the
present invention, respectively.

Figure 2:
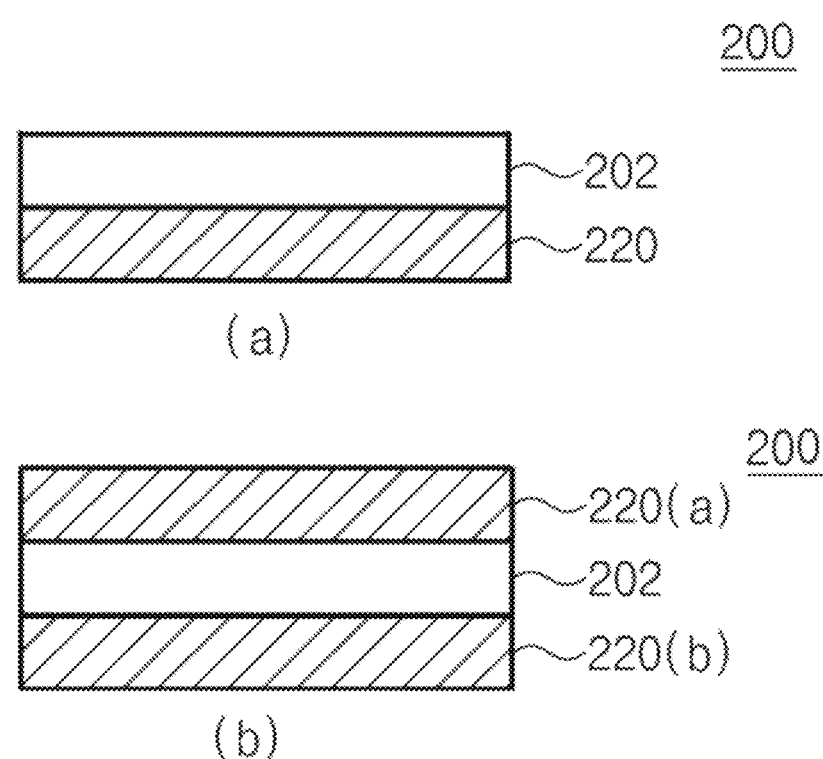
FIG. 2 is cross-sectional views of swelling tapes according to embodiments of the present invention.
Figure 2:
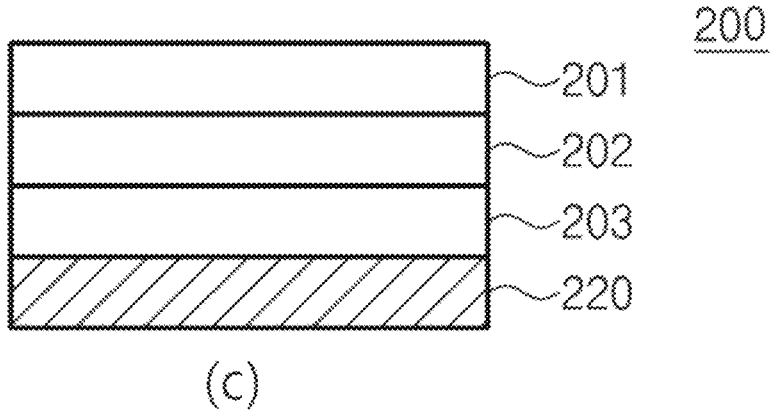

That is, as illustrated in (a) of FIG. 2, a swelling tape 200
of the present invention according to an embodiment may
include a base layer 202 and an adhesive swelling layer 220
formed on one surface of the base layer.

Also, as illustrated in (b) of FIG. 2, a swelling tape 200
of the present invention according to an embodiment may
include adhesive swelling layers 220 (a) and 220 (b) formed
on both surfaces of the base layer 202.

Furthermore, as illustrated in (c) of FIG. 2, a swelling tape
200 of the present invention according to an embodiment
may include an adhesive layer 201, the base layer 202, a
back coating layer 203, and the adhesive swelling layer 220,
wherein the back coating layer 203 may be formed between
the base layer 202 and the adhesive swelling layer 220.

Electrode Assembly in which Swelling Tape is Attached
to Outer Circumferential Surface Next, an electrode assembly, in which the swelling tape
for a secondary battery according to the present invention is
attached to an outer circumferential surface thereof, will be
described.

(1) Swelling Tape for Secondary Battery

Since the configuration of the swelling tape for a second-
ary battery has been described above, a description thereof
will be omitted, and, hereinafter, a shape of the swelling tape
attached to the outer circumferential surface of the electrode
assembly will be described.

The swelling tape of the present invention may be dis-
posed on the outer circumferential surface of the wound
electrode assembly to maintain a shape of the electrode
assembly, and may be simultaneously disposed between the
outer circumferential surface of the electrode assembly and
an inner surface of the battery case to prevent the movement
of the electrode assembly in the battery case.

Specifically, the swelling tape of the present invention
may be attached to surround an entire height of the outer
circumferential surface of the electrode assembly, and, more
preferably, may be attached to a portion excluding portions
of an upper end portion and a lower end portion of the outer
circumferential surface of the electrode assembly.

The upper end portion of the electrode assembly is a
portion that acts as a space through which the electrolyte
may permeate between the battery case and the electrode
assembly, and the lower end portion is a portion where the
electrolyte injected into a bottom of the battery case is in
contact with the electrode assembly. Thus, in consideration
of impregnability of the electrolyte impregnated in the
electrode assembly, it is desirable that the swelling tape is
not attached to the portions of the upper end portion and the
lower end portion of the electrode assembly.

In addition, the swelling tape may be wound and attached
to cover an entire length of the outer circumferential surface of the electrode assembly, and, in order to prevent the movement of the electrode assembly, it is desirable to attach the swelling tape by wrapping the swelling tape one or more times within a range covering the entire length of the outer circumferential surface of the electrode assembly.

Length and thickness of the swelling tape of the present invention are not necessarily limited because they may be variably deformed according to specifications of the battery, but, for example, a minor axis length (width) of the swelling tape may be the same as a height (length) of the electrode assembly to be described later, or may be smaller or larger by about 1% to 10% or less, wherein it is most desirable that it is smaller by about 10% or less. If, in a case in which the minor axis length (width) of the swelling tape is smaller by 10% or more based on the height (length) of the electrode assembly to be described later, there is a disadvantage in that the effect of preventing the movement of the electrode assembly may not be sufficiently achieved. Also, in a case in which the minor axis length (width) of the swelling tape is larger by 1% or more based on the height (length) of the electrode assembly to be described later, since the swelling tape is attached to the portions of the upper end portion and the lower end portion of the electrode assembly, there is a disadvantage in that the impregnability of the electrolyte is reduced.

(2) Electrode Assembly

Next, the electrode assembly will be described.

The electrode assembly according to the present invention includes a positive electrode, a negative electrode, and a separator (not shown) disposed between the positive electrode and the negative electrode to electrically insulate them, and, in this case, the positive electrode, the separator, and the negative electrode may be wound together and formed in a jelly-roll shape.

i) Positive Electrode

The positive electrode constituting the electrode assembly according to the present invention may include a positive electrode active material layer including a positive electrode active material, and, if necessary, the positive electrode active material layer may further include a conductive agent and/or a binder.

The positive electrode active material may include a lithium metal oxide including lithium and at least one metal such as cobalt, manganese, nickel, or aluminum. Specifically, the lithium metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-z}Ni_zO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a mixture of two or more thereof may be included.

The positive electrode active material may be included in an amount of 90 wt % to 99 wt %, for example, 93 wt % to 98 wt % based on a total weight of solid content in the positive electrode active material layer.

The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; fluorocarbon powder; metal powder such as aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode active material layer.

The binder is a component that improves the adhesion between the positive electrode active material particles and the adhesion between the positive electrode active material and the current collector, wherein the binder is commonly added in an amount of 1 wt % to 30 wt % based on the total weight of the solid content in the positive electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The positive electrode of the present invention may be prepared by a method of preparing a positive electrode which is known in the art. For example, the positive electrode may be prepared by a method in which a positive electrode current collector is coated with a positive electrode slurry, which is prepared by dissolving or dispersing the positive electrode active material, the binder, and/or the conductive agent in a solvent, dried, and then rolled to form a positive electrode active material layer, or a method in which the positive electrode active material is cast on a separate support and a film separated from the support is then laminated on the positive electrode current collector.

The positive electrode current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Microscopic irregularities may be formed on a surface of the positive electrode current collector to enhance a binding force with the positive electrode active material described above.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the active material slurry including the positive electrode active material as well as selectively the binder and the conductive agent is in a range of 10 wt % to 70 wt %, for example, 20 wt % to 60 wt %.

ii) Negative Electrode

Next, the negative electrode constituting the electrode assembly according to the present invention includes a negative electrode active material layer including a negative electrode active material, and the negative electrode active material layer may further include a conductive agent and/or a binder, if necessary.

The negative electrode active material may include at least one negative electrode active material selected from the group consisting of a carbonaceous material such as natural graphite and artificial graphite; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides of the metals; and composites of the metals and carbon.

The negative electrode active material may be included in an amount of 80 wt % to 99 wt % based on a total weight of solid content in the negative electrode active material layer.

The conductive material and the binder, which are the same as or different from those used in the preparation of the positive electrode, may be used. In this case, the conductive agent may be added in an amount of 1 wt % to 20 wt % based on the total weight of the solid content in the negative electrode active material layer, and the binder may be added in an amount of 1 wt % to 30 wt % based on the total weight of the solid content in the negative electrode active material layer.

The negative electrode may be prepared by a method of preparing a negative electrode which is known in the art. For example, the negative electrode may be prepared by a method in which a negative electrode current collector is coated with a negative electrode active material slurry, which is prepared by dissolving or dispersing the negative electrode active material as well as selectively the binder and the conductive agent in a solvent, rolled and dried to form a negative electrode active material layer, or may be prepared by casting the negative electrode active material on a separate support and then laminating a film separated from the support on the negative electrode current collector.

The negative electrode current collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, similar to the positive electrode current collector, microscopic irregularities may be formed on a surface of the current collector to enhance a binding force with the negative electrode active material, and the negative electrode current collector may be used in various shapes such as that of a film, a sheet, a foil, a net, a porous body, a foam body, a nonwoven fabric body, and the like.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode active material slurry including the negative electrode active material as well as selectively the binder and the conductive agent is in a range of 50 wt % to 75 wt %, for example, 50 wt % to 65 wt %.

iii) Separator

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator included in the electrode assembly according to the present invention, and a polyolefin-based porous polymer film coated with inorganic particles (e.g.: $Al_2O_3$) or a typical porous nonwoven fabric, for example, a nonwoven fabric formed of high melting point glass fibers or polyethylene terephthalate fibers may be used, but the present invention is not limited thereto.

Secondary Battery

Next, a lithium secondary battery according to the present invention will be described.

The lithium secondary battery according to the present invention provides a cylindrical type secondary battery which includes an electrode assembly having a swelling tape for a secondary battery attached to an outer circumferential surface thereof, an electrolyte, and a cylindrical battery case accommodating the electrode assembly and the electrolyte. Since the electrode assembly having the swelling tape for a secondary battery attached to the outer circumferential surface thereof has been described above, a description thereof will be omitted, and other components will be described below.

(1) Electrolyte

The cylindrical type secondary battery according to the present invention includes an electrolyte so that lithium ions generated by an electrochemical reaction in an electrode may move during charge and discharge.

As the electrolyte, a liquid electrolyte containing a non-aqueous organic solvent in which a lithium salt is dissolved, or a gel polymer electrolyte containing a polymer resin capable of being gelated in the non-aqueous organic solvent may be used without limitation.

Various lithium salts typically used in an electrolyte for a lithium secondary battery may be used as the lithium salt without limitation. For example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $CH_3SO_3^-$, $CF_3$ $(CF_2)_7SO_3^-$, $CF_3CO_2^-$, $CH_3CO_2^-$, $SCN^-$, and $(CF_3CF_2 SO_2)_2N^-$ as an anion.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiTFSI ($LiN (SO_2CF_3)_2$), LiFSI ($LiN(SO_2F)_2$), $LiCH_3SO_3$, $LiCF_3CO_2$, $LiCH_3CO_2$, and LiBETI ($LiN(SO_2CF_2CF_3)_2$). Specifically, the lithium salt may include a single material selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI ($LiN(SO_2F)_2$), and LiBETI ($LiN(SO_2CF_2CF_3)_2$), or a mixture of two or more thereof.

The lithium salt may be appropriately changed in a normally usable range, but may be included in a concentration of 0.8 M to 4.0 M, for example, 1.0 M to 3.0 M in the electrolyte to obtain an optimum effect of forming a film for preventing corrosion of a surface of an electrode.

The non-aqueous organic solvent may include a cyclic carbonate-based organic solvent, a linear carbonate-based organic solvent, or a mixed organic solvent thereof.

The cyclic carbonate-based organic solvent is an organic solvent which may well dissociate a lithium salt in an electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include at least one selected from dimethyl carbonate, ethyl methyl carbonate, and dipropyl carbonate.

The electrolyte may easily penetrate between polymers constituting the swelling tape for a secondary battery of the present invention to expand them.

(2) Cylindrical Battery Case

The cylindrical type secondary battery according to the present invention may include a cylindrical battery case accommodating the electrode assembly and a cap assembly for sealing the cylindrical battery case on an upper portion of the cylindrical battery case.

The cap assembly may further include an insulating gasket, and may allow a current generated in the electrode assembly to flow to an external device.

An inner surface of the cylindrical battery case of the present invention may be formed of a material having relatively good affinity with the electrolyte, such as aluminum (Al) or iron (Fe).

A cylindrical type secondary battery 300 according to the present invention may be prepared by a conventional method.

Figure 3:
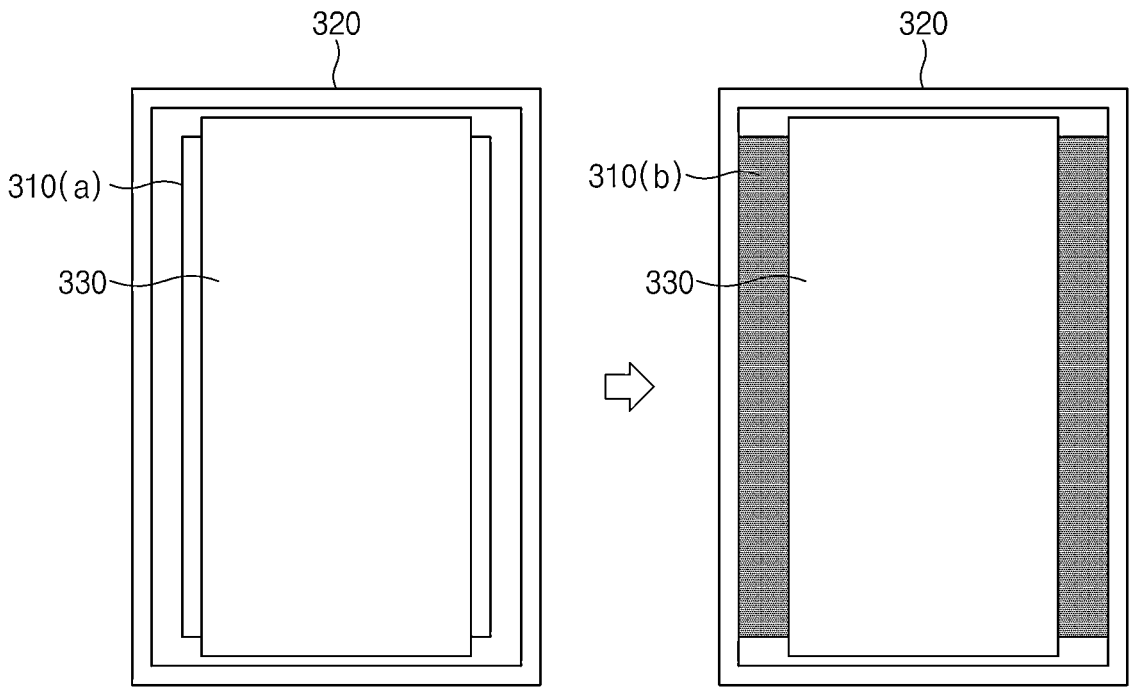
FIG. 3 is a schematic view exemplarily illustrating a process in which the swelling tape is formed in a three-dimensional shape during a preparation process of a secondary battery according to an embodiment of the present invention.

As illustrated in FIG. 3, after a swelling tape 310*a* for a secondary battery of the present invention is attached to an outer circumferential surface of an electrode assembly 330, the electrode assembly 330, to which the swelling tape 310*a* is attached, is accommodated in a cylindrical battery case (cylindrical can) 320.

Then, the above-described electrolyte (not shown) is injected into the cylindrical battery case 320.

As a result, while the swelling tape 310*a* attached to the outside of the electrode assembly 330 and the electrolyte are in contact with each other, since the non-aqueous organic solvent included in the electrolyte penetrates the base layer constituting the swelling tape 310*a* and between the polymers constituting the adhesive swelling layer or the like, the swelling tape is primarily expanded (not shown). Accordingly, a gap between the electrode assembly 330 and the battery case 320 may be filled.

Then, after a secondary battery is assembled by a known method of fixing the cap assembly to an opening of the battery case, a conventional post-treatment process, for example, a formation process and an aging process, may be performed to prepare a secondary battery.

In this case, the formation process is a process of activating the battery by repeating charge and discharge after assembling the battery. In the formation process, lithium ions from a lithium metal oxide used as a positive electrode are moved and intercalated into a carbon electrode used as a negative electrode during charge, wherein, in this case, since lithium is highly reactive, it reacts with the carbon negative electrode to form compounds, such as $Li_2CO_3$, LiO, and LiOH, and thus, these compounds form a film called an SEI (Solid Electrolyte Interface) on a surface of the carbon electrode.

Also, the aging process is a process in which the battery is left standing for a certain period of time to stabilize the SEI. In general, the aging process is performed by exposing the secondary battery (5) subjected to the assembly process to an environment of 50° C. to 70° C. for 18 hours to 36 hours.

Since the gap is completely filled to fix the electrode assembly while the swelling tape is secondarily expanded 310 (*b*) by the aging process, the movement of the electrode assembly 330 may be effectively prevented.

The secondary battery may be used in various devices. The secondary battery may be used in means of transportation, such as an electric bicycle, an electric vehicle, and a hybrid, but the present invention is not limited thereto and the secondary battery may be used in various devices in which a secondary battery may be used.

Although the exemplary embodiments of the present invention have been described in detail, the scope of the present invention is not limited thereto but various modifications and improvements made by those skilled in the art using the basic concept of the present invention defined in the claims also fall within the scope of the present invention.

EXAMPLES

Example 1

(Preparation of Swelling Tape)

An about 30 μm thick cast film formed of thermoplastic polyurethane (TPU) was prepared as a base layer. A 10 μm thick adhesive layer made of an acrylate-based resin was formed on one surface of the base layer, and a 15 μm thick back coating layer was formed using polybutylene terephthalate on one surface of the base layer which was opposite to the surface on which the adhesive layer had been formed. Then, as a water-based self-healing binder, chitosan (Merck, CAS No. 9012764, product name: 419419) was dissolved in water to prepare a binder composition, and one surface of the back coating layer was coated with the binder composition to a thickness of 7 μm (about 23% with respect to the base layer) and dried to prepare a swelling tape including an adhesive swelling layer (see FIG. 2(*c*)).

(Preparation of Electrode Assembly and Battery)

The swelling tape was attached to an outer circumferential surface of a jelly roll-shaped electrode assembly (cross-sectional diameter: 17.2 mm) including a negative electrode (negative electrode active material: artificial graphite), a separator, and a positive electrode (positive electrode active material: LCO). The swelling tape may be attached to cover an area of about 50% of the outer circumferential surface of the electrode assembly.

Then, after the assembly was inserted into a cylindrical battery case (cross-sectional diameter: 17.5 mm), an electrolyte (1.0 M $LiPF_6$/EC:EMC=30:70 volume ratio) was injected, and an upper portion of the cylindrical battery case was sealed with a cap assembly to complete a cylindrical type secondary battery.

Example 2

A swelling tape and a cylindrical type secondary battery including the same were prepared in the same manner as in Example 1 except that an adhesive swelling layer was formed using sodium alginate (Merck, CAS No. 9005383), as a water-based self-healing binder, during the preparation of the swelling tape.

Comparative Example 1

A cylindrical type secondary battery was prepared in the same manner as in Example 1 except that a swelling tape was prepared without forming an adhesive swelling layer on a back coating layer.

EXPERIMENTAL EXAMPLES

Experimental Example 1. Impact Resistance Evaluation Test

The cylindrical type secondary batteries prepared in Examples 1 and 2 and the cylindrical type secondary battery prepared in Comparative Example 1 were charged at a 0.33 C rate to 4.2 V under a constant current/constant voltage condition at room temperature (25° C.) and cut-off charged at 0.05 C, and were discharged at 0.33 C to 2.5 V. An SOC (State Of Charge) was set to 30% based on discharge capacity after each of the above charging and discharging was performed once, and direct current internal resistance was measured (measured using PNE-0506 charge/discharge equipment (manufacturer: PNE SOLUTION Co., Ltd., 5 V, 6 A)) by a voltage drop obtained when a discharge pulse was applied at 5 A (2.5 C) for 10 seconds. The measured resistance was set as initial resistance.

Then, after the cylindrical type secondary batteries prepared in Examples 1 and 2 and the cylindrical type secondary battery prepared in Comparative Example 1 were randomly dropped three times from a height of 1.0 m to a concrete ground, respectively, a degree of appearance damage was evaluated. The results thereof are listed in Table 1 below.

TABLE 1

| | Example 1 | Example 2 | Comparative Example 1 |
|---|---|---|---|
| Degree of appearance damage by impact | 4 | 5 | 3 |

In Table 1, a degree of the most severe appearance damage (standard) was set to 1, and a degree of the lowest appearance damage was indicated as 5.

Referring to Table 1, with respect to the cylindrical type secondary batteries including the adhesive swelling layer formed of the water-based self-healing binder which were prepared in Examples 1 and 2 of the present invention, it may be confirmed that degrees of appearance damage by impact were lower than that of the cylindrical type secondary battery prepared in Comparative Example 1.

Experimental Example 2. Resistance Increase Rate Evaluation Test

After the cylindrical type secondary batteries prepared in Examples 1 and 2 and the cylindrical type secondary battery prepared in Comparative Example 1, in which the impact resistance evaluation test of Experimental Example 1 had been completed, were charged at a current density of 3 A to 4.2 V under a constant current/constant voltage condition at room temperature (25° C.) and cut-off charged at 50 mA and were discharged at a current density of 0.4 A to 2.5 V under a constant current (CC) condition, an SOC (State Of Charge) was set to 30% based on discharge capacity (DCH) after resting for 30 minutes. Thereafter, direct current internal resistance was measured (measured using PNE-0506 charge/discharge equipment (manufacturer: PNE SOLUTION Co., Ltd., 5 V, 6 A)) by a voltage drop obtained when a discharge pulse was applied three times at 0.1 A for 10 seconds and at 10 A for 1 second at room temperature (25° C.). A resistance increase rate (%) was calculated by comparing the measured direct current internal resistance with the initial resistance (0%) measured in Experimental Example 1, and the results thereof are presented in Table 2 below.

TABLE 2

| | Example 1 | Example 2 | Comparative Example 1 |
|---|---|---|---|
| Resistance increase rate (%) | 16 | 10 | 20 |

Referring to Table 2, with respect to the cylindrical type secondary batteries including the adhesive swelling layer formed of the water-based self-healing binder which were prepared in Examples 1 and 2 of the present invention, it may be confirmed that resistance increase rates were lower than that of the cylindrical type secondary battery of Comparative Example 1.

Experimental Example 3. Voltage Increase Rate Evaluation Test

Voltage increase rates for the cylindrical type secondary batteries prepared in Examples 1 and 2 and the cylindrical type secondary battery prepared in Comparative Example 1, in which the impact resistance evaluation test of Experimental Example 1 had been completed, were measured using a voltage/resistance meter (Hioki RM 3548), and, the results thereof are presented in Table 3 below.

TABLE 3

| | Example 1 | Example 2 | Comparative Example 1 |
|---|---|---|---|
| Voltage increase rate (%) | 2.0 | 1.8 | 2.4 |

Referring to Table 3, with respect to the cylindrical type secondary batteries including the adhesive swelling layer formed of the water-based self-healing binder which were prepared in Examples 1 and 2 of the present invention, it may be confirmed that voltage increase rates were lower than that of the cylindrical type secondary battery of Comparative Example 1.

The invention claimed is:

1. A swelling tape for a secondary battery, the swelling tape comprising:
   a base layer; and
   an adhesive swelling layer,
   wherein the adhesive swelling layer comprises a water-based self-healing binder,

wherein the water-based self-healing binder comprises at least one compound selected from the group consisting of a ceramic matrix composite (CMC), sodium alginate, ethyl lauroyl alginate, propylene glycol alginate, and chitosan, and wherein the swelling tape is configured to attach to an outer circumferential surface of an electrode assembly of a secondary battery.

2. The swelling tape of claim 1, wherein the adhesive swelling layer is present on at least one surface of opposite surfaces of the base layer.

3. The swelling tape of claim 1, wherein a thickness of the adhesive swelling layer is in a range of 10% to 50% of a total thickness of the base layer.

4. The swelling tape of claim 1, further comprising at least one layer selected from an adhesive layer and a back coating layer.

5. The swelling tape of claim 4, wherein the base layer has a first surface and a second surface opposite the second surface, wherein the adhesive layer is present on the first surface of the base layer, and wherein the back coating layer is present on the second surface of the base layer.

6. The swelling tape of claim 4, wherein the at least one layer is the adhesive layer, and wherein the adhesive layer is:

(i) between the base layer and the adhesive swelling layer, or (ii) on at least one surface selected from the base layer and the adhesive swelling layer.

7. The swelling tape of claim 4, wherein the at least one layer is the back coating layer, and wherein the back coating layer is:

(i) between the base layer and the adhesive swelling layer, or (ii) on the adhesive swelling layer.

8. The swelling tape of claim 1, wherein the water-based self-healing binder has a glass transition temperature in a range of −50° C. to −30° C.

9. An electrode assembly in which the swelling tape of claim 1 is attached to the outer circumferential surface of the electrode assembly.

10. A cylindrical type secondary battery comprising:

the electrode assembly of claim 9, an electrolyte, and a cylindrical battery case accommodating the electrode assembly and the electrolyte.

*   *   *   *   *